J. R. SNYDER.
TRIPLE VALVE.
APPLICATION FILED OCT. 24, 1912.
1,136,057.
Patented Apr. 20, 1915.
3 SHEETS—SHEET 1.
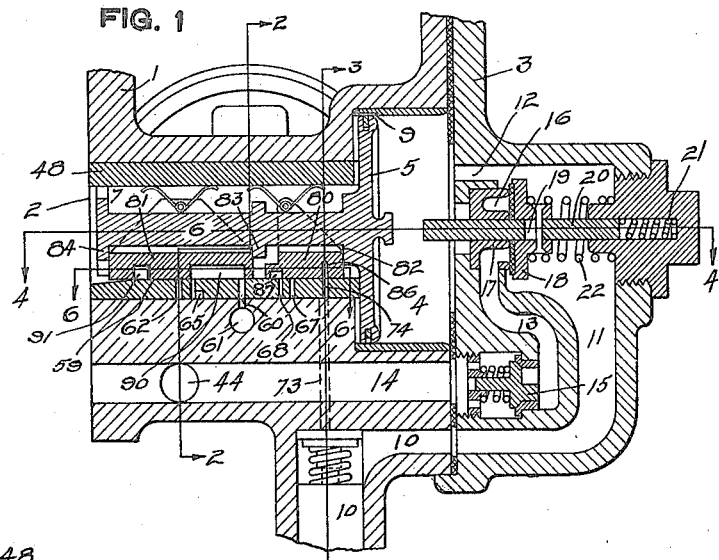
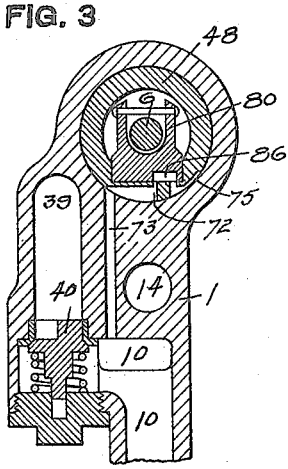
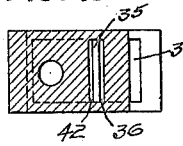
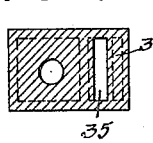
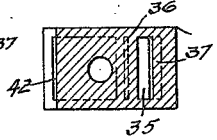
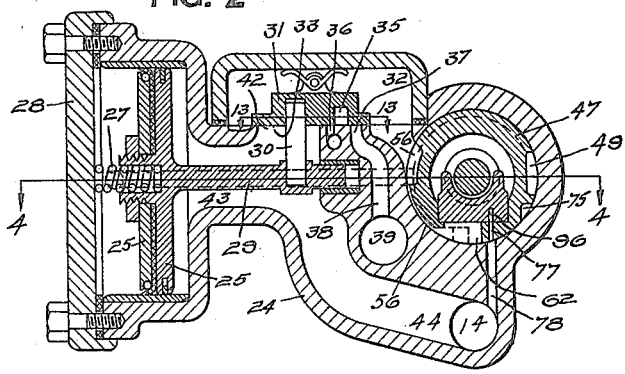
WITNESSES
Alfred S. Osbourne
L. C. Staver.
INVENTOR
Jacob Rush Snyder
By Fred K. W. Winter
Attorney

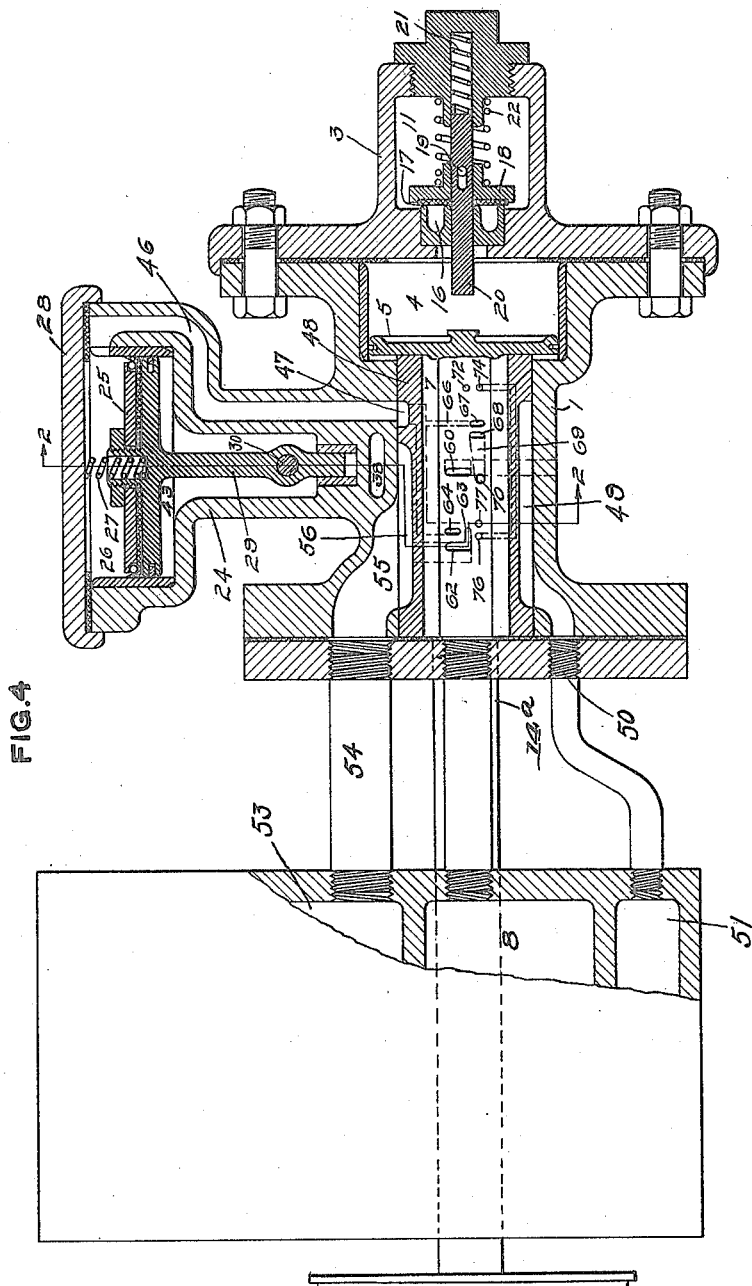

J. R. SNYDER.
TRIPLE VALVE.
APPLICATION FILED OCT. 24, 1912.

1,136,057.

Patented Apr. 20, 1915.

3 SHEETS—SHEET 3.

WITNESSES
Alfred S. Osbourne
I. C. Staver.

INVENTOR
Jacob Rush Snyder
By Fredk W. Winter
Attorney

UNITED STATES PATENT OFFICE.

JACOB RUSH SNYDER, OF PITTSBURGH, PENNSYLVANIA, ASSIGNOR TO PERCY E. DONNER, OF PITTSBURGH, PENNSYLVANIA.

TRIPLE VALVE.

1,136,057.

Specification of Letters Patent.

Patented Apr. 20, 1915.

Application filed October 24, 1912. Serial No. 727,542.

*To all whom it may concern:*

Be it known that I, JACOB RUSH SNYDER, a resident of Pittsburgh, in the county of Allegheny and State of Pennsylvania, have invented a new and useful Improvement in Triple Valves, of which the following is a specification.

This invention relates to triple valves for air brake systems, and more particularly for freight car service.

The principal object of the invention is to provide triple valve mechanism whereby after full service application of the brakes,— that is, after equalization between the auxiliary reservoir, train pipe and brake cylinder,—additional pressure can be graduated into the brake cylinder at the will of the engineer, and to any desired degree, practically to complete depletion of train pipe pressure, and doing this without destroying the other functions of the valve, or disturbing the braking effect of the other triple valves in the train. As a consequence the braking power can be so adjusted or proportioned that ordinary full service application of the brakes provides sufficient power to hold the car when empty, and by reason of the additional braking pressure or high pressure application, as I call it, the braking power can be increased so as to hold the car when loaded on steep grades without the use of hand brakes.

Further objects of the invention are to provide a triple valve having all of the usual functions of triple valves and in addition so arranged as to produce a quick release of the brakes throughout the train, a quick serial action of the brakes throughout the train in service application as well as in emergency application, and, further, to supply the brake cylinder with pressure in direct proportion to the train pipe pressure reduction and irrespective of variations of piston travel and to maintain the brake cylinder pressure against leakage in service, high pressure application and emergency positions; and which performs these various functions by a much simpler and less complicated construction than prior valves capable of effecting some of these results and functions.

The invention comprises the construction and arrangement of a triple valve hereinafter described and claimed.

Figure 10:
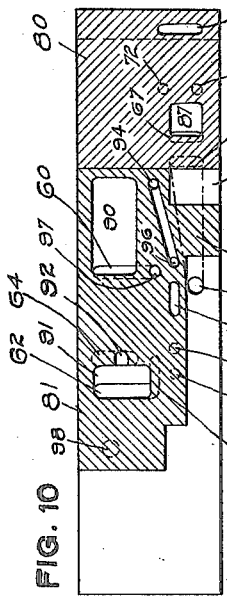
Figure 11:
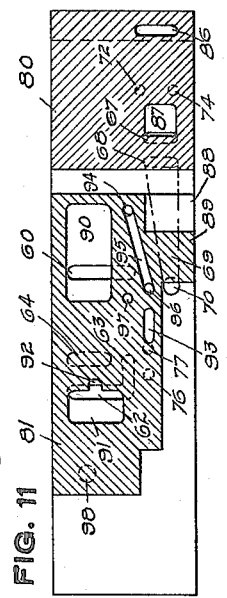
Figure 12:
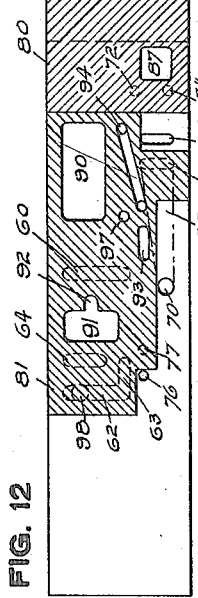
Figure 5:
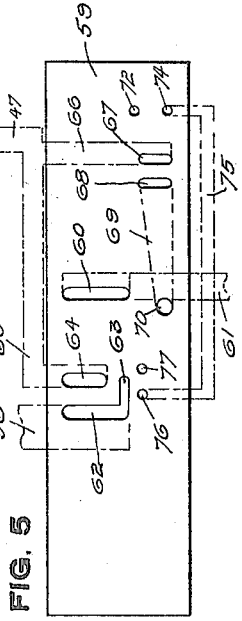
Figure 6:
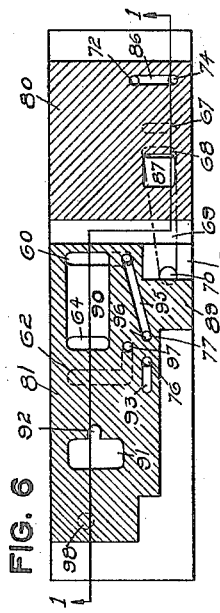

In the accompanying drawings Figure 1 is a longitudinal section through a triple valve embodying the invention, when in full and quick release and running position, taken on the line 1—1, Fig. 6; Fig. 2 is a transverse section taken substantially on the line 2—2, Figs. 1 and 4; Fig. 3 is a similar section taken on the line 3—3, Fig. 1; Fig. 4 is a horizontal section through the valve on the line 4—4, Fig. 1, with the piston stem and slide valves removed, and showing the connections to the auxiliary reservoir, supplementary reservoir and application chamber; Fig. 5 is a plan view of the main slide valve seat on an enlarged scale; Figs. 6, 7, 8, 9, 10, 11 and 12 are diagrammatic views showing the main valve seat in plan and the slide valves in horizontal section on the line 6—6, Fig. 1, and showing different positions of the valve, Fig. 6 showing the same in full and quick release and running position, Fig. 7 in quick service or quick serial application position, Fig. 8 in full service position, Fig. 9 in service lap position, Fig. 10 in high pressure application position, Fig. 11 in high pressure lap position, and Fig. 12 in emergency application position; and Figs. 13, 14 and 15 are diagrammatic views showing the supplementary valve seat in plan and the supplementary slide valve in horizontal section on the line 13—13, Fig. 2, and showing the different positions of this valve, Fig. 13 showing the same in full and quick release position, Fig. 14 in service and release lap position, and Fig. 15 in service and pressure maintenance position.

The valve in its general form, construction and arrangement follows the standard type of Westinghouse and similar valves. It comprises a main casing 1 provided at one end with a flat face 2 for the usual connection to the auxiliary reservoir and brake cylinder, and is closed at its opposite end by the head or cap 3. In said casing is the usual chamber 4 in which works the main piston 5 which is provided with a stem 6 extending into the chamber or bore 7 of the casing and actuating the slide valves. The auxiliary reservoir 8 is connected with the end of the chamber or bore 7, and is normally supplied with air through the feed groove 9 in the bushing of piston chamber 4, which groove is uncovered when the valve is in release position. The train pipe connection is to the passage 10 which extends through the casing and communicates with chamber 11 in the head or cap 3, from which communication is had with piston chamber 4 through port 12. Chamber 11 also has a valve controlled communication with a passage 13 in the head or cap 3 which in turn communicates with a passage 14 through the main casing 1 and which is connected by pipe 14ª to the brake cylinder 14ᵇ. In this connection is a spring actuated check valve 15 seating away from the brake cylinder and toward the train pipe, said valve being shown housed in a suitable recess in the head or cap 3. The passage 13 ends in an annular portion 16 in a valve seat member 17, with which coöperates a valve 18 having a slot and pin connection 19 with the graduating stem 20. The latter is normally held projected inwardly by the usual graduating spring 21, and valve 18 is normally held to its seat by spring 22. In service applications the main piston 5 abuts the end of the graduating stem and is stopped thereby without compressing graduating spring 21, and in high pressure application position spring 21 is compressed until the lost motion in connection 19 is taken up, when the resistance of spring 22 is encountered and this stops the further outward travel of the piston 5; but in emergency applications both springs 21 and 22 are compressed, thereby unseating valve 18 and permitting train pipe pressure to rush through the passages 13 and 14 to the brake cylinder.

Formed on one side of the main casing 1 is a casing 24 for a supplementary valve mechanism, the same comprising a piston 25 working in a chamber 26 formed in the outer portion of the casing 24, and which piston is preferably normally held inwardly by means of spring 27 between the piston and the head 28 which closes the outer end of casing 24. Said piston is provided with a stem 29 from which extends an arm 30 for actuating slide valve 31 which works in chamber 32 on a seat 33. The slide valve 31 is provided on its lower face with a single cavity 35. The valve seat 33 is provided with exhaust port 36 leading to the atmosphere; with train pipe port 37 communicating with passage 38 which communicates with another passage 39 leading to the train pipe passage 10 and controlled by a spring actuated check valve 40 seating away from the train pipe; and a third port or opening 42 through which the arm 30 projects and which communicates with the chamber 43 on the inner face of piston 25, and from which a passage 44 leads to the brake cylinder passage 14 in the main body of the casing. The chamber 26 on the outer face of piston 25 communicates through passage 46 with an annular passage 47 in the upper outer face of the bushing 48 of the triple valve, and which passage 47 in turn communicates with a longitudinal passage 49 having a connection at 50 with the application chamber or reservoir 51. A supplementary reservoir 53 has a connection through pipe 54 with a passage 55 in the main body of the casing and which communicates through the groove 56 in the outer face of the main bushing 48 with the chamber 32 in which slide valve 31 operates.

The main bushing 48 provides the valve seat 59, which is provided with the ports and passages shown in Fig. 5, to-wit, an exhaust port 60 communicating with the lateral port 61 leading to the atmosphere; a port 62 communicating through lateral groove 56 with the supplementary reservoir passage 55 and provided with a longitudinal extension 63; a port 64 adjacent to supplementary reservoir port 62 and communicating through passage 65 with the application chamber passage 47, and having communication through passage 66 with another port 67 near the opposite end of seat 59; a port 68 longitudinally in line with the port 67 and communicating through longitudinal passage 69 with a port 70; a small port 72 near one end of the valve seat and communicating through passage 73 with the train pipe passage 10; a small port 74 transversely in line with port 72 and communicating through passage 75 with another small port 76 adjacent to the supplementary reservoir port 62; and a small port 77 longitudinally in line with port 76 and communicating through passage 78 with the brake cylinder passage 14.

Coöperating with the seat 59 are a pair of slide valves 80 and 81. The slide valve 80 is held between annular collars 82 and 83 on the main piston stem but does not fill the space between said collars so that the piston can move to a limited extent without moving the valve. Valve 81 is held between collar 83 and annular collar 84 on the inner end of the piston stem 6 and entirely fills the space between said collars so that at all times it moves with said piston. These valves are held to the seat by the usual springs 85. Valve 80 is of rectangular form and is provided on its lower face near one end with a small transverse cavity 86 and near its opposite end with a larger substantially rectangular cavity 87. The valve 81 is of somewhat irregular outline in plan view, having one corner at its outer end entirely cut away, as at 88, and is provided adjacent thereto with a lateral projection 89. It is provided in its lower face with a large longitudinal cavity 90, a smaller substantially rectangular cavity 91 provided with a longitudinal extension 92, a small longitudinal cavity 93, and a port 94 connected by diagonal passage 95 with another port 96, and is also provided with a hole 97 extending entirely through the same and, if desired, may be provided near its inner end with a larger hole 98 extending entirely through the same.

The valve has seven positions, as follows:

1. *Full and quick release and running position.* (Shown in Figs. 1, 3, 4 and 6.)—In this position the main piston is at its extreme forward or inward stroke so as to uncover feed groove 9 and permit train pipe pressure to flow to the bore 7 and thence to the auxiliary reservoir 8, and also through the hole 97 in slide valve 81 which registers with the extension 63 of the supplementary reservoir port 62, so that both the auxiliary and supplementary reservoirs are charged to the point of equalization with the train pipe. In this position, also, the cavity 90 in the slide valve 80 connects the application chamber port 64, with exhaust port 60, while the ports 94 and 96 overlap respectively the exhaust port 60 and brake cylinder port 77 so that the application chamber and brake cylinder are both vented to the atmosphere. The venting of the application chamber also exhausts pressure from the chamber 26 on the outer face of supplementary piston 25, and the supplemental slide valve 31 takes the position shown in Fig. 13, where the cavity 35 in the valve connects port 42 with the exhaust port 36, thus venting the brake cylinder to the atmosphere through this valve, and also uncovers port 37 thereby permitting air to flow from chamber 32, which is connected to the supplementary reservoir, to the train pipe. The last named connection results in supplying to the train pipe at each car fluid pressure from the supplementary reservoir to create a series of waves of pressure from car to car toward the rear of the train and secure a more rapid serial release of the brakes throughout the train than would be possible if all of the air for this purpose had to flow through the engineer's valve. The brake cylinder is exhausted mainly through this supplementary valve, and the connection through ports 94 and 96 and diagonal passage 95 in the main valve is merely to take the last remnant of air from the brake cylinder in case the supplementary valve moves over (as it will do) to the position shown in Fig. 14 in which the connection between brake cylinder port 42 and exhaust port 36 is broken, this position being the lap position of the supplementary valve due to the expansion of spring 27, and is the position which this supplementary valve maintains during running position of the main valve in order to blank the connection from the supplementary reservoir to the train pipe and prevent supplementary reservoir air flowing to the train pipe and defeating the application of the brakes upon reduction of train pipe pressure for service application.

Figure 7:
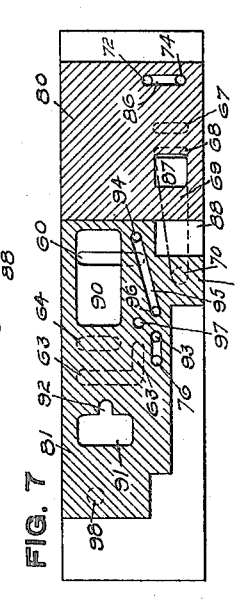
Figure 8:
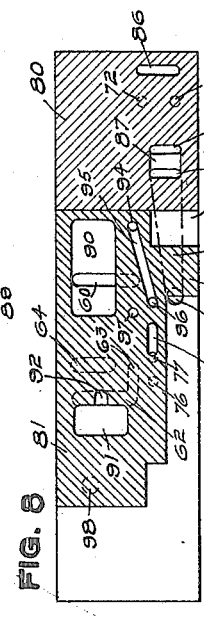
Figure 9:
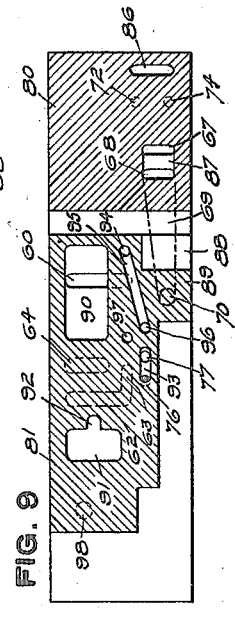

2. *Quick service or serial venting position.* (Shown in Fig. 7.)—This position is assumed upon the first movement of the main piston upon slight reduction of train pipe pressure, and results in moving the slide valve 81 from the position shown in Fig. 6 to that shown in Fig. 7, but without moving the slide valve 80 due to the lost motion connection between said valve and the main piston stem. In this position the connections between the application chamber port 64 and brake cylinder port 77 and the exhaust port 60 are broken by the valve 81, and at the same time the cavity 93 in said valve connects port 76 with brake cylinder port 77, and as valve 80 still connects train pipe port 72 with port 74, train pipe pressure flows from port 72 through the connection shown to the brake cylinder port 77. The result is that the train pipe is momentarily vented to the brake cylinder, which is at atmospheric pressure, thereby producing a drop in pressure in the train pipe at the car, and securing a quicker serial action of the brakes throughout the train than would be possible if all the air had to flow forwardly and out through the engineer's brake valve. The air passing to the brake cylinder produces a light setting of the brakes. Feed groove 9 is blocked off, and supplementary reservoir port 62 is also closed, thereby trapping the air in said supplementary reservoir. The valve remains in this position for a brief time, due to the fact that the first movement of the piston 5 moves only the slide valve 81, but as soon as the lost motion between the piston stem 6 and the slide valve 80 is taken up, the added frictional resistance encountered momentarily checks the movement of the piston, thereby providing an appreciable time of venting the train pipe into the brake cylinder. The reduction of train pipe pressure caused thereby produces a sufficient unbalancing of pressures on the opposite sides of the main piston to overcome the friction of both slide valves, and the valve almost immediately moves over to the next position, now to be described.

3. *Full service position.* (Shown in Fig. 8.)—In this position the cavity 87 in valve 80 connects port 68 with application chamber port 67, while the extension 89 of valve 81 has uncovered port 70, thereby permitting auxiliary reservoir pressure to flow through port 70, passage 69, port 68, cavity 87, to port 67 and thence to the application chamber 51 and also to the chamber 26 on the outer face of supplementary piston 25, thereby driving said piston 25 inwardly so that slide valve 31 moves to the position shown in Fig. 15, uncovering port 42 and connecting chamber 32 (which is connected to the supplementary reservoir) to passage 44 leading to the brake cylinder connection 14. Consequently, the brake cylinder is supplied with pressure from the supplementary reservoir. As soon as brake cylinder pressure slightly exceeds the pressure in chamber 26 (which is the pressure of the application chamber) the piston 25 is moved back or outwardly, moving the valve 31 to lap position and covering port 42. Should the brake cylinder pressure drop from any cause, such as leakage, the piston 25 again moves inwardly, again establishing connection between the supplementary reservoir and the brake cylinder. Consequently this valve serves not only to supply the brake cylinder with pressure but maintains said pressure constant irrespective of leakages, and equal to the pressure in the application chamber. In the application the pressure in the brake cylinder is brought up to the pressure in chamber 51, entirely irrespective of the travel of the brake cylinder piston, so that the valve serves to produce and maintain at all times a uniform pressure equal to the pressure in the application chamber. All other ports in the main valve seat are lapped.

4. *Service lap position.* (Shown in Fig. 9.)—This position is assumed on a slight recoil, such as occurs immediately after a service application due to a momentary overbalancing of pressure on the train pipe side of the main piston. The slide valve 80 has remained stationary, due to the lost motion connection between itself and the main piston stem, but the slide valve 81 has moved over sufficiently to cover port 70, thereby cutting off further flow of air from the auxiliary reservoir to the application chamber. All other ports in the main valve seat are blanked in this position of the valve. The supplementary valve 31, however, will operate as above described to maintain the brake cylinder pressure in case of leakage, moving alternately between the positions shown in Figs. 14 and 15. To increase the service application pressure the train pipe pressure is further reduced which results in the slide valves admitting more pressure to the application chamber to again move the supplementary valve to establish communication between the supplementary reservoir and brake cylinder. This can be continued until the auxiliary reservoir equalizes with the application chamber.

5. *High pressure application position.* (Shown in Fig. 10.)—This position is assumed after a full service application of the brakes (that is, equalization between the train pipe, auxiliary reservoir and application chamber pressures) in case the engineer desires to still further increase the braking pressure. In moving to full service position the end of the main piston stem abuts against the graduating stem 20, and then stops, due to the resistance of graduating spring 21. If higher braking pressure is desired the engineer still further reduces train pipe pressure, thereby causing the piston 5 to move still farther outwardly, compressing spring 21, until the lost motion in the connection between said stem and the valve 18 is taken up, when it will encounter the added resistance of spring 22 which causes the valve mechanism to stop in the position shown in Fig. 10. In this position cavity 91 in slide valve 81 overlaps supplementary reservoir port 62, while its extension 92 overlaps application chamber port 64, thereby permitting the air from the supplementary reservoir to flow to the application chamber and increasing the pressure in the latter. This results in moving supplementary piston 25 inwardly to again open communication between the supplementary reservoir and the brake cylinder, to still further increase the brake cylinder pressure. The supplementary valve will maintain the brake cylinder pressure equal to the new pressure in the application chamber, regardless of leakage, in the manner hereinbefore described. To prevent overcharging of the application chamber when the valve is in this position, the hole 97 in slide valve 81 is provided, which in this position registers with the exhaust port 60, thereby permitting auxiliary reservoir pressure to exhaust slowly to the atmosphere, and as soon as the pressure on the auxiliary side of the main piston drops slightly below train pipe pressure, the main valves move back to the position next to be described, breaking the connection between the supplementary reservoir port 62 and the application chamber port 65. This added supplementary pressure may be supplied to the brake cylinder as frequently as necessary by successive reductions of train pipe pressure, until the supplementary reservoir has equalized with the application chamber and with the brake cylinder. In this position the connection between the auxiliary reservoir and application chamber is broken so as to prevent pressure from the application chamber from flowing back into the auxiliary reservoir. The assumption of this position does not affect the quick release feature of dumping air into the train pipe when the valve returns to release position.

6. *High pressure lap position.* (Shown in Fig. 11.)—This position is assumed by the lapping back of the main valve due to the venting of auxiliary reservoir pressure through hole 97 to the exhaust port 60, as above described, said valve being moved back to this position by the expansion of spring 21. The effect is to break the connection from the supplementary reservoir to the application chamber as above described.

It will be readily gathered from the last two positions of the valve that after a full service application, that is after equalization has been established between the auxiliary reservoir, the train pipe and the brake cylinder, additional pressure can be graduated into the brake cylinder at the will of the engineer, up to the maximum braking capacity, which is equalization between the supplementary reservoir, the application chamber and the brake cylinder. It is also evident that this high pressure application is established without in any way destroying or reducing the sensitiveness of the valve as to release, or in any manner disturbing the braking effect of the other triple valves in the train. The brake rigging can be so adjusted that the ordinary full service application of the brakes provides sufficient power to hold the car when empty, and by going to the high pressure application position more power can be had as desired to hold the car when loaded on steep grades, so that the use of hand-brakes in coming down steep grades can be entirely dispensed with.

7. *Emergency position.* (Shown in Fig. 12.)—This position is assumed upon a large reduction in train pipe pressure, which causes the main piston 5 to compress both springs 21 and 22 and move fully outwardly, thereby dragging with it both slide valves. The full movement of the piston outwardly unseats valve 18, thereby permitting train pipe pressure to flow through passages 13 and 14 directly to the brake cylinder. This reduces train pipe pressure at the car and secures a quick serial action of the brakes throughout the train, but as soon as the brake cylinder pressure overcomes train pipe pressure the check valve 15 closes, and thereafter the application is completed by the equalization of auxiliary reservoir pressure with the application chamber. The cut away portion 88 of slide valve 81 establishes direct connection from the auxiliary reservoir to the application chamber port 67, permitting equalization between the application chamber and the auxiliary reservoir. This results in forcing the supplementary piston 25 sharply inwardly, opening a wide communication from the supplementary reservoir to the brake cylinder, and securing a strong application of the brakes. If the hole 98, heretofore referred to, through slide valve 81 is provided, this registers in emergency application position with supplementary reservoir port 62, thereby permitting supplementary reservoir pressure to flow to the application chamber, and results in a full equalization between the supplementary reservoir, the auxiliary reservoir, the application chamber and the brake cylinder. If the hole 98 is not provided, the supplementary valve mechanism serves to maintain the brake cylinder pressure against leakage.

The emergency position of the valve can be secured either directly from full release position, or from any of the other positions of the valve, by reducing the train pipe pressure sufficiently for the auxiliary reservoir pressure to overbalance the train pipe pressure and springs 21 and 22. An important function of the supplementary valve mechanism is to maintain brake cylinder pressure against leakage. The high pressure application can be obtained without the supplementary valve mechanism by so arranging the ports and passages in the main valve mechanism that upon reduction of train pipe pressure after full service application communication is established between the supplementary reservoir and the brake cylinder and at the same time the auxiliary reservoir is vented to the atmosphere.

The valve performs all of the usual functions of freight triple valves and in addition provides for a quick service application of the brakes, a quick release of the brakes, and for a high pressure application after full service application, as above described, and is furthermore so arranged as to secure uniform pressure in the brake cylinder irrespective of piston travel, and to maintain such pressure against leakage. By means of this valve sufficient power can be secured in high pressure application position to hold loaded cars when going down steep grades so as to dispense with the use of hand-brakes, as is necessary with present types of freight triple valves. When this improved triple valve is used in connection with my train pipe pressure maintenance valve described and claimed in my application filed June 24, 1912, Serial No. 705,566, it produces practically ideal conditions in freight service as there cannot then be any variation in service application pressure without the knowledge of the engineer, or indeed without having been purposely brought about by him.

What I claim is:—

1. In a fluid pressure brake, the combination of a train pipe, brake cylinder, a reservoir on a car, a pressure chamber, means arranged upon reduction of train pipe pressure to establish communication between said reservoir and said pressure chamber, and means actuated by pressure in said pressure chamber for establishing communication between said reservoir and the brake cylinder and upon increase in train pipe pressure to establish communication between said reservoir and the train pipe.

2. In a fluid pressure brake, the combination of a train pipe, brake cylinder, auxiliary reservoir and supplementary reservoir, of a pressure chamber, means actuated upon reduction of train pipe pressure to establish communication between the auxiliary reservoir and said pressure chamber, and means actuated by pressure in said pressure chamber and arranged to establish communication between the supplementary reservoir and the brake cylinder and upon increase in train pipe pressure to establish communication between a supplementary reservoir and the train pipe.

3. In a fluid pressure brake, the combination of a train pipe, brake cylinder, auxiliary reservoir and a supplementary reservoir, of a pressure chamber, means actuated upon service reductions of train pipe pressure to establish communication between the auxiliary reservoir and said pressure chamber, upon reduction of train pipe pressure after full service application to establish communication between the supplementary reservoir and said pressure chamber, and means actuated by pressure in said pressure chamber arranged upon admission of pressure thereto to connect the supplementary reservoir to the brake cylinder and upon release of pressure therefrom to establish communication between the supplementary reservoir and the train pipe.

4. In a fluid pressure brake, the combination of a train pipe, brake cylinder, a reservoir on a car, and an additional source of pressure, of a pressure chamber, means arranged upon reduction in train pipe pressure to connect the reservoir to said pressure chamber and upon increase in train pipe pressure to connect said pressure chamber to the atmosphere, and means actuated by pressure in said pressure chamber and arranged upon the admission of pressure thereinto to connect the additional source of pressure to the brake cylinder and upon the exhaustion of pressure therefrom to connect the additional source of pressure to the train pipe.

5. In a fluid pressure brake, the combination of a train pipe, brake cylinder, a reservoir on a car, and an additional source of pressure, of a pressure chamber, means arranged upon reduction in train pipe pressure to connect the reservoir to said pressure chamber and upon increase in train pipe pressure to connect said pressure chamber to the atmosphere, and means actuated by pressure in said pressure chamber and arranged upon the admission of pressure thereinto to connect the additional source of pressure to the brake cylinder and upon the exhaustion of pressure therefrom to connect the additional source of pressure to the train pipe and connect the brake cylinder to the atmosphere.

6. In a fluid pressure brake, the combination of a train pipe, brake cylinder, auxiliary and supplementary reservoirs on a car, a piston actuated by variations in train pipe pressure, a main valve actuated by said piston, a spring held graduating stem arranged to be contacted by said piston, a valve carried by said graduating stem and controlling communication between the train pipe and the brake cylinder, said valve having a limited movement on said stem whereby the main valve can be moved against the resistance of the graduating spring upon gradual reductions of train pipe pressure after equalization of train pipe and auxiliary reservoir pressures to permit pressure from the supplementary reservoir to flow to the brake cylinder without actuating the valve on the graduating stem, and whereby said main valve can be actuated upon sudden reductions of train pipe pressure to open said valve and thereby open communication from the train pipe to the brake cylinder.

7. In a fluid pressure brake, the combination of a train pipe, brake cylinder, auxiliary and supplementary reservoirs on a car, a piston actuated by variations of train pipe pressure, a main valve actuated by said piston, a spring held graduating stem arranged to be contacted by said piston, a valve slidable on said stem and controlling communication between the train pipe and brake cylinder, said valve and stem being joined by a slot and pin connection, whereby the main valve can be moved against the resistance of said spring held stem upon gradual reductions of train pipe pressure after equalization of train pipe and auxiliary reservoir pressures and cause the actuation of means for opening communication from the supplementary reservoir to the brake cylinder without actuating the valve on the graduating stem.

8. In a fluid pressure brake, the combination of a train pipe, brake cylinder, auxiliary and supplementary reservoirs on a car, a piston actuated by variations in train pipe pressure, a main valve actuated by said piston, a spring held graduating stem arranged to be contacted by said piston, a valve slidable on said stem and controlling communication between the train pipe and brake cylinder, said valve and stem being joined by a slot and pin connection, whereby said main valve can be moved against the resistance of said spring held stem upon gradual reductions of train pipe pressure after equalization of train pipe and auxiliary reservoir pressures and cause the actuation of means for opening communication from a supplementary reservoir to the brake cylinder without actuating the valve on the graduating stem, and upon sudden reductions in train pipe pressure can be moved against said graduating stem to actuate the valve thereon and open communication from the train pipe to the brake cylinder.

9. A triple valve having connections to the atmosphere, train pipe, brake cylinder, auxiliary reservoir and supplementary reservoir, of ports and valve mechanism arranged on service reduction of train pipe pressure to admit air from the auxiliary reservoir to a supplementary valve device, upon reduction of train pipe pressure after full service application to admit air from the supplementary reservoir to the supplementary valve device and upon increase in train pipe pressure to connect the supplementary valve device to the atmosphere, and a supplementary valve device operating between brake cylinder pressure and pressure admitted thereto by the main valve mechanism and arranged upon the admission of pressure thereto by the main valve mechanism to connect the supplementary reservoir to the brake cylinder, upon reduction of brake cylinder pressure after application to admit more pressure to said brake cylinder, and upon exhaustion of pressure therefrom to connect the brake cylinder to the atmosphere and connect the supplementary reservoir to the train pipe.

10. In a triple valve, the combination of a piston operating by variations in train pipe pressure, a spring-held graduating stem arranged to be contacted by said piston, a valve carried by said graduating stem and controlling communication between the train pipe and the brake cylinder, said valve having a limited movement on said stem whereby the stem may be moved without opening the valve, and a spring normally holding said valve to its seat.

11. In a triple valve, the combination of a piston operating under reduction of train pipe pressure, a spring-held graduating stem arranged to be contacted by said piston, a valve slidable on said stem and controlling communication between the train pipe and brake cylinder, and a spring normally holding said valve to its seat, said valve and stem being joined by a slot and pin connection so arranged that the stem may have a limited outward movement without unseating the valve.

In testimony whereof, I have hereunto set my hand.

JACOB RUSH SNYDER.

Witnesses:
WILLIAM B. WHARTON,
I. C. STAVER.